US011028902B2

(12) United States Patent
Simon et al.

(10) Patent No.: US 11,028,902 B2
(45) Date of Patent: Jun. 8, 2021

(54) PLANETARY GEAR TRAIN

(71) Applicant: Safran Transmission Systems, Colombes (FR)

(72) Inventors: Adrien Louis Simon, Moissy-Cramayel (FR); Simon Loïc Clément Lefebvre, Moissy-Cramayel (FR); Guillaume Jean Pierre Robinet, Moissy-Cramayel (FR)

(73) Assignee: SAFFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/770,212

(22) PCT Filed: Nov. 29, 2018

(86) PCT No.: PCT/FR2018/053043
§ 371 (c)(1),
(2) Date: Jun. 5, 2020

(87) PCT Pub. No.: WO2019/110892
PCT Pub. Date: Jun. 13, 2019

(65) Prior Publication Data
US 2020/0386299 A1    Dec. 10, 2020

(30) Foreign Application Priority Data

Dec. 7, 2017   (FR) ...................................... 1761793

(51) Int. Cl.
*F16H 1/48* (2006.01)
*F16H 57/08* (2006.01)

(52) U.S. Cl.
CPC ............. *F16H 1/48* (2013.01); *F16H 57/082* (2013.01)

(58) Field of Classification Search
None
See application file for complete search history.

(56) References Cited

U.S. PATENT DOCUMENTS

| 3,943,787 | A | 3/1976 | Hicks |
| 9,038,779 | B2 | 5/2015 | McCune et al. |
| 2009/0170655 | A1* | 7/2009 | Seanz De Ugarte ...................... F16H 57/082 475/331 |

(Continued)

FOREIGN PATENT DOCUMENTS

| EP | 0 658 704 A1 | 6/1995 |
| FR | 2 268 202 A1 | 11/1975 |

(Continued)

*Primary Examiner* — Colby M Hansen
(74) *Attorney, Agent, or Firm* — Blank Rome LLP (57) ABSTRACT

A planetary gearset having a first planet gear, a second planet gear, and pinion gears. The pinion gears mesh with the first planet gear and with the second planet gear, and each pinion gear is pivotally mounted around a shaft. A pinion gear carrier supports each shaft. Each shaft has a radially inner cylindrical portion mounted on the pinion gear carrier, a radially outer cylindrical portion about which the pinion gear is pivotally mounted and a flange extending radially from the radially outer cylindrical portion. The radially outer periphery of the flange is mounted on the pinion gear carrier. The radially outer cylindrical portion and the radially inner cylindrical portion are connected to each other by a radially extending connecting zone.

8 Claims, 5 Drawing Sheets

(56) References Cited

U.S. PATENT DOCUMENTS

2011/0243740 A1* 10/2011 Siegfriedsen ........... F03D 80/70
416/170 R
2016/0025187 A1* 1/2016 Stoakes .................... F16H 1/48
475/331

FOREIGN PATENT DOCUMENTS

WO     WO 03/002891 A1    1/2003
WO     WO 2014/046960 A1    3/2014

* cited by examiner

PLANETARY GEAR TRAIN

CROSS REFERENCES TO RELATED APPLICATIONS

This application is a national phase of PCT/FR2018/053043, filed Nov. 29, 2018, which claims the benefit of French Application No. 1761793, filed Dec. 7, 2017, the subject matter of each of which are incorporated by reference herein in their entirety.

FIELD OF THE INVENTION

The present invention relates to a planetary gearset for a turbomachine, such as, for instance, an aircraft turbojet engine or a turboprop engine.

BACKGROUND OF THE INVENTION

In the case of a turbojet engine, a planetary gearset may in particular make it possible to couple a blower and a shaft integral with the rotor of a compressor and/or a turbine. In this way it is possible to adapt the rotation speed of the blower so that it is different from the rotation speed of the turbine rotor.

A planetary gearset can also be used to couple the propeller of a turboprop engine to a shaft coupled to the rotor of a turbine so that the rotation speed of the propeller can be adjusted as required.

The use of such a planetary gearset in a turbomachine is known in particular from U.S. Pat. No. 9,038,779. In this document, the planetary gearset consists of an inner planet gear, an outer planet gear, pinion gears meshing with the inner planet gear and the outer planet gear, each pinion gear being pivotally mounted around a shaft, and a pinion gear carrier supporting each shaft.

During operation, a high torque is transmitted through the planetary gearset train, which can deform the pinion gear carrier and generate a misalignment of the pinion gears with respect to the inner and outer sun gears, leading to a degradation of the performance of the meshing and wear of the teeth. In order to avoid a misalignment of the operating pinion gears, document WO 2014/046960 proposes to arrange shims between the pinion gears so as to take up the forces and ensure that the sun gears shafts are kept parallel to the axis of the inner planet gear and the outer planet gear.

The use of additional shims increases the complexity, cost and mass of the planetary gearset.

SUMMARY OF THE INVENTION

The invention aims to remedy such drawback in a reliable and inexpensive way.

For this purpose, the invention concerns a planetary gearset train comprising:
  a first sun gear,
  a second sun gear,
  pinion gears meshing with the first sun gear and the second sun gear, each pinion gear being pivotally mounted around a shaft,
  a pinion gear carrier supporting each shaft, characterised in that each shaft extends along an axis and comprises a radially inner cylindrical portion mounted on the pinion gear carrier, a radially outer cylindrical portion about which the pinion gear is pivotally mounted and a flange extending radially from the radially outer cylindrical portion, the radially outer periphery of the flange being mounted on the pinion gear carrier, the radially outer cylindrical portion and the radially inner cylindrical portion being connected to each other by a radially extending connecting zone.

In this way, there is an annular space between the radially inner cylindrical part and the radially outer cylindrical part. Such a structure allows a controlled deformation of the shaft at the flange, cylindrical parts or connection area to compensate for the deformations of the pinion gear carrier. In this way, good performance of the meshing between the pinion gears and the planet gears is maintained while avoiding premature wear of the teeth.

The pinion gear carrier may have a first radially extending annular first flange and a second radially extending annular second flange, the first and second flanges being axially offset from each other and connected to each other by axially extending connecting parts.

The flange of each shaft can be mounted on the first side of the pinion gear carrier, the radially inner cylindrical part of each shaft being mounted on the second side of the pinion gear carrier.

The first sun gear may be located radially inside the pinion gears, the second planet gear being located radially outside the pinion gears.

The first planet gear, the second planet gear and the sun gears may each have a first annular toothing and a second annular toothing, axially offset from each other, the first toothing of each sun gear meshing with the first toothing of the first planet gear and with the first toothing of the second planet gear, the second toothing of each sun gear meshing with the second toothing of the first planet gear and with the second toothing of the second planet gear.

The outer planet gear may have a first ring with the first toothing and a second ring with the second toothing.

The planetary carrier can be made of the same material as the shafts or of two different materials.

The planetary carrier and shafts are for example made of steel or titanium.

The planetary gearset may have a cover in which the pinion gear carrier, the pinion gears and the shafts are at least partially housed.

The cover may comprise a first annular part and a second annular part, delimiting said volume.

The inner and outer sun gears are intended to rotate and the pinion gear carrier and shafts are intended to be held stationary during operation.

The internal planet gear can also be called a sun gear. The external planet is also called a crown gear.

The radially inner cylindrical part and the radially outer cylindrical part may be tubular, the thickness of the radially inner cylindrical part being less than the thickness of the radially outer cylindrical part.

Let kc be the stiffness constant of the pinion gear carrier and let kp be the stiffness constant of each shaft, the pinion gear carrier and the shafts can be dimensioned such that $0.5 \cdot kc < kp < 2kc$. Definitions of stiffness constants are given below.

The invention may also relate to a turbomachine, such as an aircraft turbojet or turboprop engine, with a planetary gearset train of the above-mentioned type.

The invention will be better understood and other details, characteristics and advantages of the invention will appear when reading the following description, which is given as a non-limiting example, with reference to the attached drawings.

DETAILED DESCRIPTION

FIGS. 1 to 4 illustrate a planetary gearset train 1 according to one embodiment of the invention. This consists of an internal planet gear 2 or sun gear, an external sun gear 3 or ring gear, pinion gears 4 which are rotatably mounted on shafts 5 and a pinion gear carrier 6 on which the shafts 5 of the pinion gears 6 are mounted. Planetary gearset 1 also has a cover 7 or ring gear carrier.

The internal planet gear 2 is annular with an axis A and has a first annular and radially outer, axially offset first toothing 9a and a second annular and radially outer toothing 9b.

Each pinion gear 4 is annular and has a radially inner cylindrical surface 10. Each pinion gear 4 further comprises a first toothing 11a and a second toothing 11b, axially offset from each other, meshing respectively with the first and second toothings 9a, 9b of internal sun gear 2.

Pinion gear carrier 6 has a first annular flank 12 and a second annular flank 13 axially offset from each other and connected by axially extending connecting parts 14. The first flank 12 has circular openings 15 of B axis. The second flank 13 has holes 16 of axis B, located axially opposite the circular openings 15 of the first flank. The link parts 14 delimit slots 17 used for the mounting of pinion gears 4. Said housings 17 open radially outwards so as to allow the radial mounting of the pinion gears 4 in said housings 17 of the pinion gear carrier 6.

Each shaft 5 extends along the corresponding axis B and comprises a radially inner cylindrical part 18, a radially outer cylindrical part 19 around which the pinion gear 4 is pivotally mounted and a flange 20 extending radially from the radially outer cylindrical part 19. The radially outer periphery of flange 20 has a cylindrical flange 20a, one end of which, called the front end, is extended by a radial flange 20b, so that it has a generally L-shaped cross-section. The outer surface of the cylindrical flange 20a is mounted without play or with little play in the opening 15 of the first flange 12 of the pinion gear carrier 6. The radial flange 20b is axially supported on the radial front face of the first flank 12.

Said inner cylindrical part 18 has more particularly a first zone 21 or front zone, of smaller diameter than a second zone 22 or rear zone. The rear area 22 is mounted without play or with little play in hole 16 of the second side 13 of the pinion gear carrier 6. The second zone 22 has an annular groove 23 on its radially outer surface.

The outer diameter of said second zone 22 is denoted d0. The thickness of the first zone 21, i.e. the radial distance between the inner surface and the outer surface of the first zone 21, is denoted e0. The outer diameter of the first zone 21 is denoted d3. The dimensions of the first zone 21 are defined to provide flexibility in the first zone 21.

The outer diameter of the radially outer cylindrical part 19 is denoted d1. The thickness of the radially outer cylindrical part 19, i.e. the radial distance between the outer surface and the inner surface, is denoted e1.

The width of the radial annular part 20 of the flange, i.e. the axial dimension of said radial annular part 20, is denoted l2. The outer diameter of the flange 20a is denoted d4. The width l2 is defined to provide flexibility at flange 20.

The external radially cylindrical part 19 and the internal radially cylindrical part 18 are connected to each other by an annular connecting zone 24 extending radially. In particular, the connecting zone 24 connects one end, in particular the front end, of the inner cylindrical part 18 and a middle zone of the outer cylindrical part 19. An annular space 25 is defined between the radially inner cylindrical part 18 and the radially outer cylindrical part 19. The smallest width of connection area 24, i.e. the smallest axial distance from connection area 24, is denoted l3.

The dimensions d0, d1, d3 and d4 are defined such that d3<d0<d1<d4. In addition, the dimensions e0 and e1 are defined such that e0≤e1.

The shafts 5 and the pinion gear carrier 6, for example, are made of steel or titanium.

Figure 1:
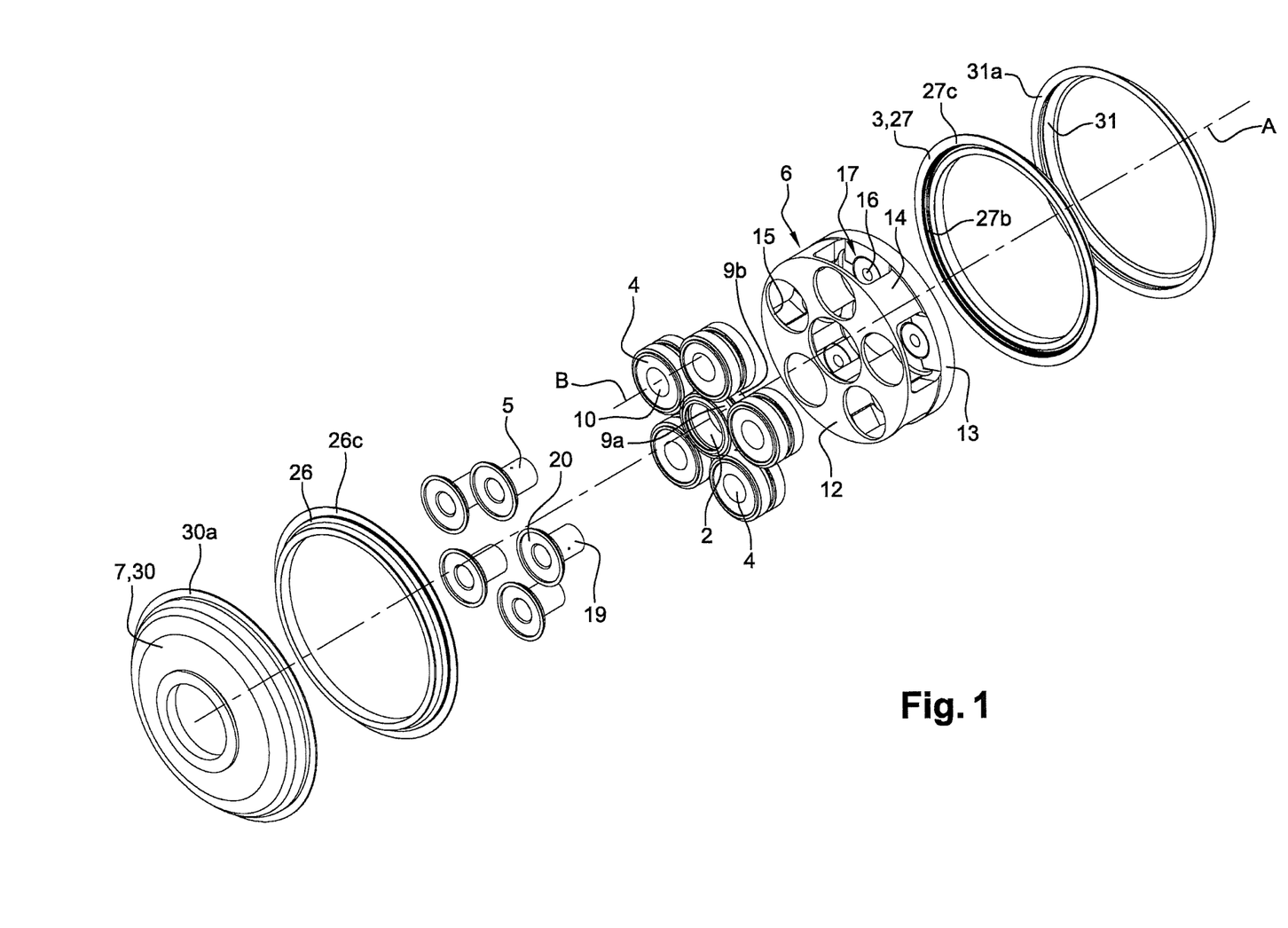
FIG. 1 is an exploded perspective view of a planetary gearset train according to one embodiment of the invention.
Figure 2:
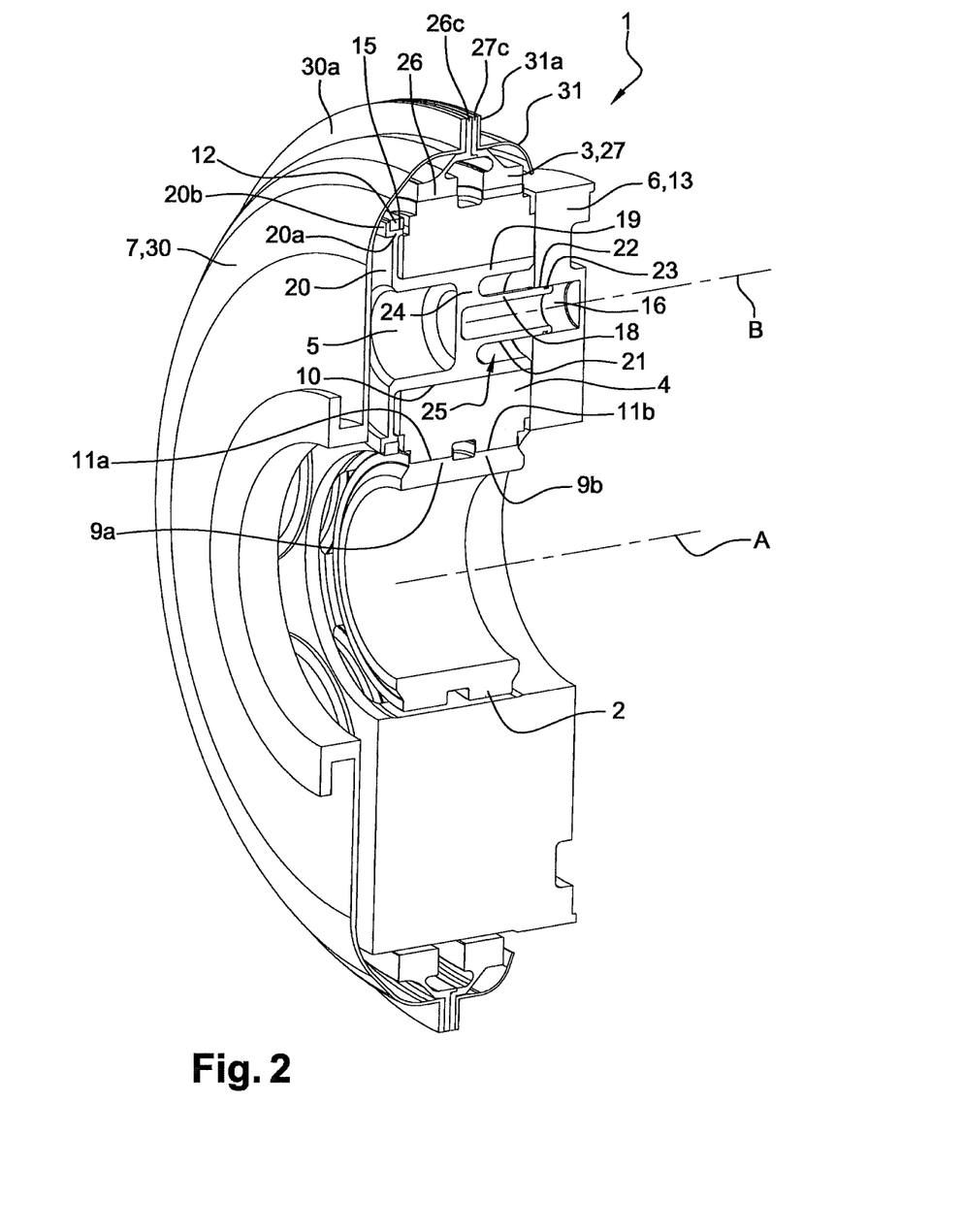
FIG. 2 is an axial sectional view of the planetary gearset train.
Figure 3:
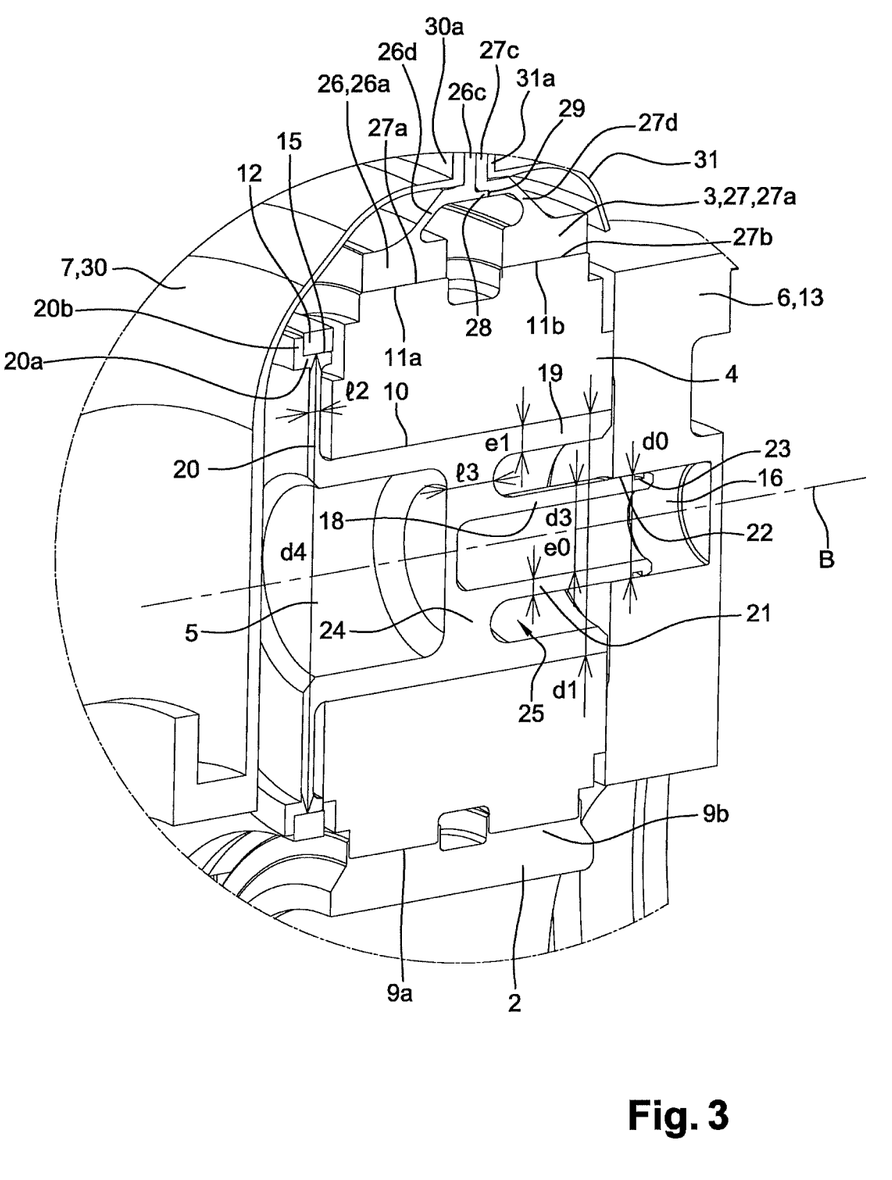
FIG. 3 is a detailed view of a part of FIG. 2.
Figure 4:
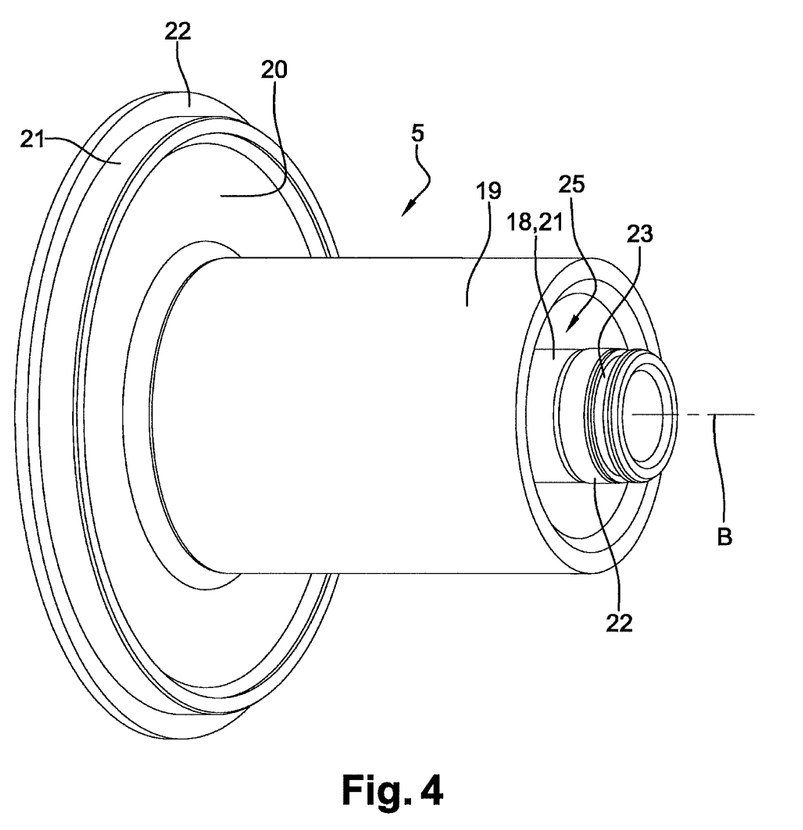
FIG. 4 is a perspective view of a pinion gear shaft.
Figure 5:
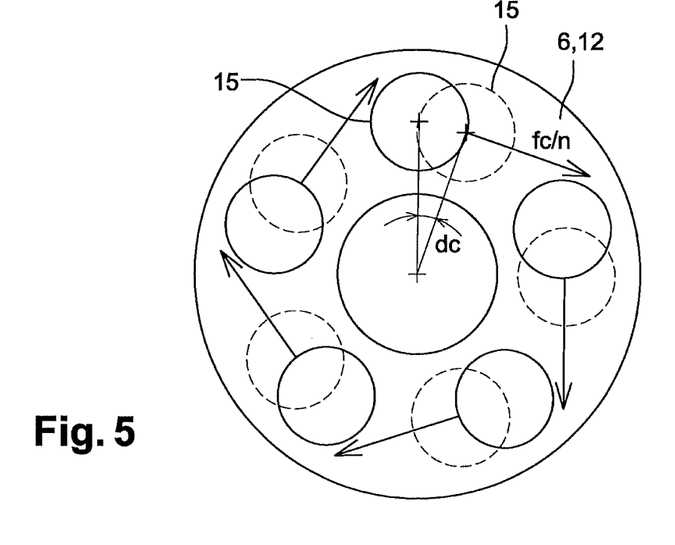
FIG. 5 shows schematically the deformation of the first side of the pinion gear carrier when a force fc is applied at the edges of the openings of the first side.

FIG. 5 shows schematically the deformation dc of the first flank 12 of the pinion gear carrier 6 when a force fc is applied at the edges of the openings 15 and the second flank 13 is defined as fixed. For a number n of openings 12, the value of the force applied to each opening 12 is equal to fc/n, the forces being evenly distributed over the different openings 12. This effort fc results in a displacement dc of each opening 12. After said displacement, the openings 12 are shown in dotted lines. The stiffness constant kc of pinion gear carrier 6 is defined by the equation kc=fc/dc.

Figure 6:
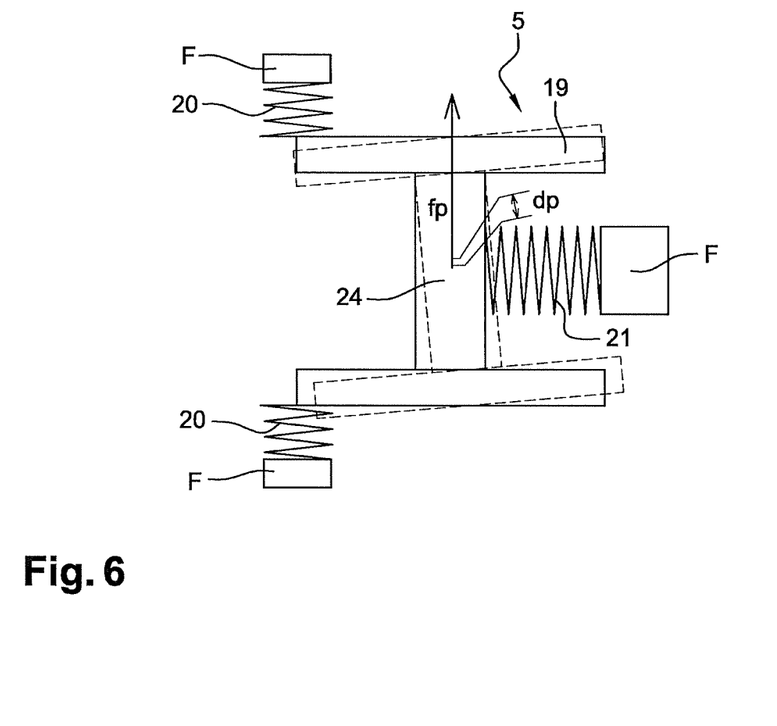
FIG. 6 schematically illustrates the deformation kp of a shaft when a force fp is applied to the shaft.

FIG. 6 schematically illustrates the deformation dp of a shaft 5 when a force fp is applied to the shaft and the outer periphery of flange 20 and the second zone 22 of the inner part 18 are considered fixed. The flange 20 and the first zone 21 of the inner part 18 are shown as springs, due to their flexibility or softness. The parts in dotted lines illustrate said parts after deformation. The stiffness constant kp of shaft 5 is defined by the equation kp=fp/dp.

It has been calculated that the different parts of the pinion gear carrier 6 and the shafts 5 should be dimensioned in such a way that 0.5kc<kp<2kc, so that the misalignments of the shafts 5 are considered acceptable.

The external planet gear 3 includes a first ring 26 and a second ring 27 axially offset one from the other. As can be better seen in FIG. 3, each ring 26, 27 has a radially inner annular portion 26a, 27a with radially inner teeth 26b, 27b. The first ring 26 carries a first toothing 26a meshing with the first toothing 11a of each pinion gear 4. The second ring 27 carries a second toothing 27b meshing with the second toothing 11b of each pinion gear 4. Each ring 26, 27 also has a radially outer flange 26c, 27c extending radially. Finally, each ring 26, 27 has an oblique connecting wall 26d, 27d connecting the outer flange 26c, 27c and the inner annular part 26a, 27a. The connecting wall 26d of the first ring 26 widens towards the second ring 27. The connecting wall 27d of the second ring 27 widens towards the first ring 26. The radially inner periphery of flange 26c of the first ring 26 has an annular centring flange 28 engaged in a correspondingly shaped recess 29 of flange 27c of the second ring 27. The two flanges 26c, 27c are axially supported on each other. Cover 7 is attached to the flanges 26c, 27c of the first and second rings 26, 27. The cover 7 consists of a first part 30 or front part and a second part 31 or rear part, each part 30, 31 having a radial annular flange 30a, 31a on the radially outer periphery. Flanges 30a, 31a of parts 30, 31 of cover 7 are axially fixed on both sides of flanges 26c, 27c of the bushings, e.g. by welding or bolting. The first and second parts 30 and 31 of cover 7 delimit an annular internal volume housing, at least in part, the pinion gears 4, the shafts 5 and the pinion gear carrier 6.

In operation, the planetary gearset 1 according to the invention can transmit a high torque, which can have the effect of slightly deforming the pinion gear carrier 6, in particular at the second flank 13. The structure of the shafts 5 allows them to be deformed at the flange 20, the cylindrical parts 18, 19 or the connection area 24 in order to compensate for the deformations of the pinion gear carrier 6. In this way, good performance of the meshing between the pinion gears 4 and the planet gears 2, 3 is maintained while avoiding premature wear of teeth 9a, 9b, 11a, 11b, 27a, 27b.

The invention claimed is:

1. A planetary gearset comprising:
   a first planet gear;
   a second planet gear;
   pinion gears meshing with the first planet gear and the second planet gear, each pinion gear being pivotally mounted around a shaft; and
   a pinion gear carrier supporting each shaft,
   wherein each shaft extends along an axis and comprises:
      a radially inner cylindrical portion mounted on the pinion gear carrier;
      a radially outer cylindrical portion about which the pinion gear is pivotally mounted; and
      a flange extending radially from the radially outer cylindrical portion, the radially outer periphery of the flange being mounted on the pinion gear carrier, the radially outer cylindrical portion and the radially inner cylindrical portion being connected to each other by a radially extending connecting zone.

2. The planetary gearset according to claim 1, wherein the pinion gear carrier has a first radially extending annular flange and a second radially extending annular flange, the first and second flanges being axially offset from each other and connected to each other by axially extending connecting parts.

3. The planetary gearset according to claim 2, wherein the flange of each shaft is mounted on the first flank of the pinion gear carrier, the radially inner cylindrical part of each shaft being mounted on the second flank of the pinion gear carrier.

4. The planetary gearset according to claim 1, wherein the first planet gear is located radially inside pinion gears, the second planet gear being located radially outside of the pinion gears.

5. The planetary gearset according to claim 1, wherein the first planet gear, the second planet gear and the pinion gears each have a first annular toothing and a second annular toothing, which are axially offset from one another, the first toothing of each pinion gear meshing with the first toothing of the first planet gear and with the first toothing of the second planet gear, the second toothing of each pinion gear meshing with the second toothing of the first planet gear and with the second toothing of the second planet gear.

6. The planetary gearset according to claim 1, wherein the pinion gear carrier is made in the same material as the shafts.

7. The planetary gearset according to claim 1, wherein the radially inner cylindrical portion and the radially outer cylindrical portion are tubular, the thickness of the radially inner cylindrical portion being less than the thickness of the radially outer cylindrical portion.

8. The planetary gearset according to claim 1, wherein either kc the stiffness constant of the pinion gear carrier or kp the stiffness constant of each shaft, the pinion gear carrier and the shafts are dimensioned in such a way that $0.5\, kc < kp < 2kc$.

\* \* \* \* \*

UNITED STATES PATENT AND TRADEMARK OFFICE
CERTIFICATE OF CORRECTION

Page 1 of 1

PATENT NO. : 11,028,902 B2
APPLICATION NO. : 16/770212
DATED : June 8, 2021
INVENTOR(S) : Adrien L. Simon et al.

It is certified that error appears in the above-identified patent and that said Letters Patent is hereby corrected as shown below:

On the Title Page

Item (73) Assignee should be corrected to read: Safran Transmission Systems, Colombes (FR)

Signed and Sealed this
Twenty-third Day of November, 2021

Drew Hirshfeld
*Performing the Functions and Duties of the
Under Secretary of Commerce for Intellectual Property and
Director of the United States Patent and Trademark Office*